United States Patent [19]

Ishida et al.

[11] Patent Number: 5,201,630
[45] Date of Patent: Apr. 13, 1993

[54] INDUSTRIAL ROBOT WITH SERVO SYSTEM

[75] Inventors: Tatsuzo Ishida; Kazuhito Hori, both of Tokyo; Sigeru Nakamura, Chiba, all of Japan

[73] Assignee: Sony Corporation, Japan

[21] Appl. No.: 707,933

[22] Filed: May 28, 1991

Related U.S. Application Data

[63] Continuation of Ser. No. 517,545, Apr. 27, 1990, abandoned, which is a continuation of Ser. No. 172,979, Mar. 23, 1988, abandoned, which is a continuation of Ser. No. 769,253, Aug. 26, 1985, abandoned.

[30] Foreign Application Priority Data

Sep. 7, 1984 [JP] Japan .................................. 59-187333
Dec. 7, 1984 [JP] Japan .................................. 59-258924

[51] Int. Cl.⁵ .............................................. B25J 9/06
[52] U.S. Cl. .................... 414/744.5; 318/568.18; 901/9; 901/15
[58] Field of Search .............. 414/744.3, 744.5, 750, 414/744.7; 901/9, 15, 21, 23, 24; 74/506, 505, 89.22, 89.2; 403/408.1, 388; 24/31 F, 31 R, 680 D; 318/568.18, 568.15

[56] References Cited

U.S. PATENT DOCUMENTS

| | | | |
|---|---|---|---|
| 3,363,881 | 1/1968 | Kobelt | 74/506 X |
| 4,086,522 | 4/1978 | Engelberger et al. | 364/513 X |
| 4,378,959 | 4/1983 | Susnjara | 414/735 X |
| 4,547,858 | 10/1985 | Horak | 901/9 X |
| 4,550,383 | 10/1985 | Sugimoto | 318/568.15 |
| 4,562,551 | 12/1985 | Inaba et al. | 414/730 X |
| 4,568,238 | 2/1986 | Hirano et al. | 414/744 R |
| 4,610,598 | 9/1986 | Hamada et al. | 901/15 |
| 4,636,138 | 1/1987 | Gorman | 901/15 X |
| 4,645,409 | 2/1987 | Gorman | 901/23 X |

*Primary Examiner*—Michael S. Huppert
*Assistant Examiner*—Donald W. Underwood
*Attorney, Agent, or Firm*—Ronald P. Kananen

[57] ABSTRACT

An industrial robot has a servo system allowing higher-speed robot operation than in conventional robots. The servo system includes a movable arm or arms pivotable about a pivot axis or axes and/or movable along an axis or axes. The servo system includes at least one movable arm pivotal about a vertical axis and associated with a servo motor for angular displacement within a substantially horizontal plane. A servo motor for driving the horizontally pivotable movable arm is mounted on a base frame of the robot. By mounting the servo motor on the base frame, the load on the movable arm can be reduced significantly so as to allow the movable arm to be operated at higher speeds. The servo system includes a controller adapted to control robot operation. The controller is programmed to actuate the working end of the robot arm along a predetermined non-linear trace, in which an acceleration zone is defined in the vicinity of an initial position of the working end and a deceleration zone is defined in the vicinity of the predetermined working position and a relatively longer constant speed zone is defined between the acceleration zone and the deceleration zone.

3 Claims, 9 Drawing Sheets

INDUSTRIAL ROBOT WITH SERVO SYSTEM

BACKGROUND OF THE INVENTION

This application is a continuation of application Ser. No. 07/517,545 filed Apr. 27, 1990, which was a continuation of application Ser. No. 07/172,979 filed Mar. 23, 1988, which was a continuation of Ser. No. 06/769,253 filed Aug. 26, 1985, all having been abandoned.

The present invention relates generally to an industrial robot with a servo system for operating robot arms so as to position a working end at a predetermined working position on a workpiece. More specifically, the invention relates to a multi-axis robot and an operation control system for actuating robot arms from an initial position to the working position.

In recent years, industrial robots have become popular in various industries because of their capacity for accurate repetition and relatively high efficiency. Since one of the most important advantages of installing industrial robots is high efficiency in repeating simple operations, robots are required to operate at ever higher speeds. However, various factors limit acceleration of robot operations. One important factor preventing robots from being operated at ultimate speed is the inertial pseudo-forces generated during robot operation. Especially, the inertia of the robot arm or arms limits the maximum speed of robot arm movement.

Therefore, in order to enable robots to be operated at higher speeds, the inertia of the robot arms must be reduced. Also, it is necessary to stop the robot at precisely the desired positions during its operation.

In order to accurately stop a robot at a desired position, a robot arm is operated through an initial acceleration zone, an intermediate constant speed zone and a final deceleration zone. In conventional robot operation, in order to move the working end of the robot to the working position, the working end must pass one or more transient points where the robot arm comes essentially to rest. For example, assuming the working end moves from an initial point to a working point through an intermediate transient point which does not fall on the straight line connecting the initial point and the working point, acceleration zones, constant speed zones and deceleration zones must be defined both beween the initial point and the intermediate point and between the intermediate point and the working point. This clearly loses time by stopping the working end at the intermediate transient point. As set out above, since the maximum robot arm operation speed is determined by the distance through which the robot arm moves and the acceleration and deceleration characteristics of the robot servo system, stopping the robot at the transient point prevents the robot from being operated at its highest possible speed.

SUMMARY OF THE INVENTION

A principle object of the present invention is to provide an industrial robot which can operate at higher efficiency than the conventional robots.

Another and more specific object of the invention is to provide an industrial robot with less inertia than conventional robots, which thus allows higher-speed operation. A further object of the invention is to provide an industrial robot which has a robot arm or arms which can move a working end along a non-linear trace through a single acceleration zone, constant speed zone and deceleration zone.

In order to accomplish the aforementioned and other objects of the invention, an industrial robot, according to the present invention, is provided with a servo system allowing higher speed robot operation than conventional robots. The servo system includes a movable arm or arms pivotable about a pivot axis or axes and/or movable along an axis or axes. The servo system includes at least one movable arm pivotable about a vertical axis and associated with a servo motor for angular displacement within a substantially horizontal plane.

In the preferred structure, the servo motor driving the horizontally pivotable movable arm is mounted on a base frame of the robot. By supporting the servo motor by the base frame, the load on the movable arm can be reduced significantly so as to allow the movable arm to be operated at higher speeds.

In addition, the servo system includes a controller for robot operations. The controller is programmed to actuate the working end along a predetermined non-linear trace, in which an acceleration zone is defined in the vicinity of the initial position of the working end, a deceleration zone is defined in the vicinity of the predetermined working position, and an expanded constant speed zone is defined between the acceleration zone and the deceleration zone.

According to one aspect of the invention, an industrial robot comprises a base, a working end equipped with a tool for forming a predetermined operation at a predetermined working position, an arm means supporting the working end and supported by the base, the arm means including a first arm pivotally supported by the base and a second arm pivotally attached to a free end of the first arm, a first servo system mounted on the base for driving the first arm, a second servo system mounted on the base (or alternatively on the first arm as in FIGS. 1 and 2) for driving the second arm, and a servo controller iteratively deriving desired positions of the first and second arms according to a predetermined schedule and outputting control signals to the first and second servo systems for controlling the latter, in this sense in accordance with the derived desired positions.

The first arm is pivotable about an essentially vertical primary axis extending through an axis of the base, and the second arm is pivotable about an essentially vertical secondary axis. The axes of rotation of the servo motors for the first and second servo systems are subtantially in alignment wich each other.

The axes of rotation of the servo motors of the first and second servo systems are also aligned with the axis of the base.

The servo motor of the second servo system is drivingly associated with the second arm by means of a belt-drive power train. The belt-drive power train comprises a driving pulley driven by the servo motor of the second servo system, a driven pulley secured to a pivotable shaft attached to the free end od the first arm and secured to the swecond arm for rotation therewith, and a belt stretched between the driving and driven pulleys.

In the preferred structure, the belt has a first and a second section located radially symmetrically about the belt, the belt being fixed to the driving pulley at the first section and to the driven pulley at the second section. A fasterner plate is fitted onto each of the first and second sections of the belt, which fastener plates are secured to the driving and driven pulleys respectively by means of fastener bolst so as to clamp the belt to the peripheral wall of the pulley. Each of the fastener plates is curved so that it clips the belt along two parallel lines.

According to another aspect of the invention, an industrial robot comprises a base, a working end equipped with a tool for forming a predetermined operation at a predetermined working position, an arm means supporting the working end and supported by the base, the arm means including at least one movable arm movable relative to a predetermined axis, a servo system for driving the movable arm to a desired position, and a servo controller iteratively deriving the desired position of the movable arm according to a predetermined schedule and outputting a control signal to the servo motor for controlling the latter, the controller deriving the desired position on the basis of first position data indicative of the initial position of the working end, second position data indicative of the working position and known acceleration and deceleration characteristics of the servo motor so as to drive the working end between the initial position and the working position via an intermediate point offset from the straight line extending through the initial and working positions, without stopping the working end.

The servo system comprises a first servo component driving the working end in a first direction and a second servo component driving the working end in a second direction perpendicular to the first direction.

The controller derives the desired position of working end on the basis of first position data indicative of the initial position of the working end, second position data indicative of the working position, third position data indicative of a desired distance through which the working end is to be shifted in the first direction from the initial position, fourth position data indicative of the desired distance through which the working end is to be shifted in the second direction from the point identified by the third position data and on the basis of known acceleration and deceleration characteristics of the first and second servo components. The controller further derives the target operation speed of the servo system to control the speed and direction of motion of the working end.

Each of the first and second servo components is provided with acceleration and deceleration characteristics for increasing motor speed in a non-linear fashion during acceleration and decreasing motor speed in a non-linear fashion during deceleration for smooth transition between the acceleration and deceleration states and the constant speed state.

The servo system comprises a third servo component driving the working end in a third direction perpendicular in some sense to the first and second directions. The important point is that three controls are provided to control motion in three different spatial directions. Here, motion along any horizontal direction will generally require simultaneous operation of the two horizontallly-acting servo controllers and motors, since the two horizontally-acting servo controllers generally do not act orthogonally, the exception being only when the two arms are perpendicular to each other. As above, the two horizontally-acting arms can be considered to be a single servo component. The controller derives the desired position further based on the acceleration and deceleration characteristics of the third servo component.

According to a further aspect of the invention, in an industrial robot having a working end equipped with a tool for forming a predetermined operation, a movable arm means carrying the working end between an initial position and a working position and associated with a servo system comprises a first servo component driving the movable arm means in a first (vertical) direction so as to drive the working end in the first direction and a second servo component driving the movable arm means in a second (horizontal) direction perpendicular to the first direction so as to drive the working end in the second direction. The process for controlling the position of the working end comprises the steps of:

presetting first and second position data identifying the initial position and the working position respectively;

presetting third and fourth position data, the third position data representing a desired distance through which the working end is to be shifted in the first direction, and the fourth position data representing a desired distance through which the working end is to be shifted in the second direction;

presetting acceleration and deceleration characteristics of the first and second servo components;

iteratively deriving working end positions along a trace derived on the basis of preset data as well as deriving speed and direction of the working end at the derived position, the speed and direction being the vector sum of a first component in the first direction determined according to the preset acceleration and deceleration characteristics of the first servo component and a second speed component in the second direction determined according to the preset acceleration and deceleration characteristics of the second servo component; and operating the servo system so as to shift the working end between the initial position and the working position without stopping at any intermediate point.

Each of the first and second servo components increase the speed of the working end non-linearly during acceleration and decreases the speed of the working end non-linearly during deceleration to ensure smooth transition between accelerating and decelerating states and constant speed states.

The servo system may include a third servo component driving the working end in a third direction perpendicular to the first and second directions, and the derived speed and direction of the working end is the vector sum of the first speed component, the second speed component and a third speed component in the third direction determined according to the acceleration and deceleration characteristics of the third servo component.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments but are for explanation and understanding only.

In the drawings.

DESCRIPTION OF THE PREFERRED EMBODIMENT

Figure 1:
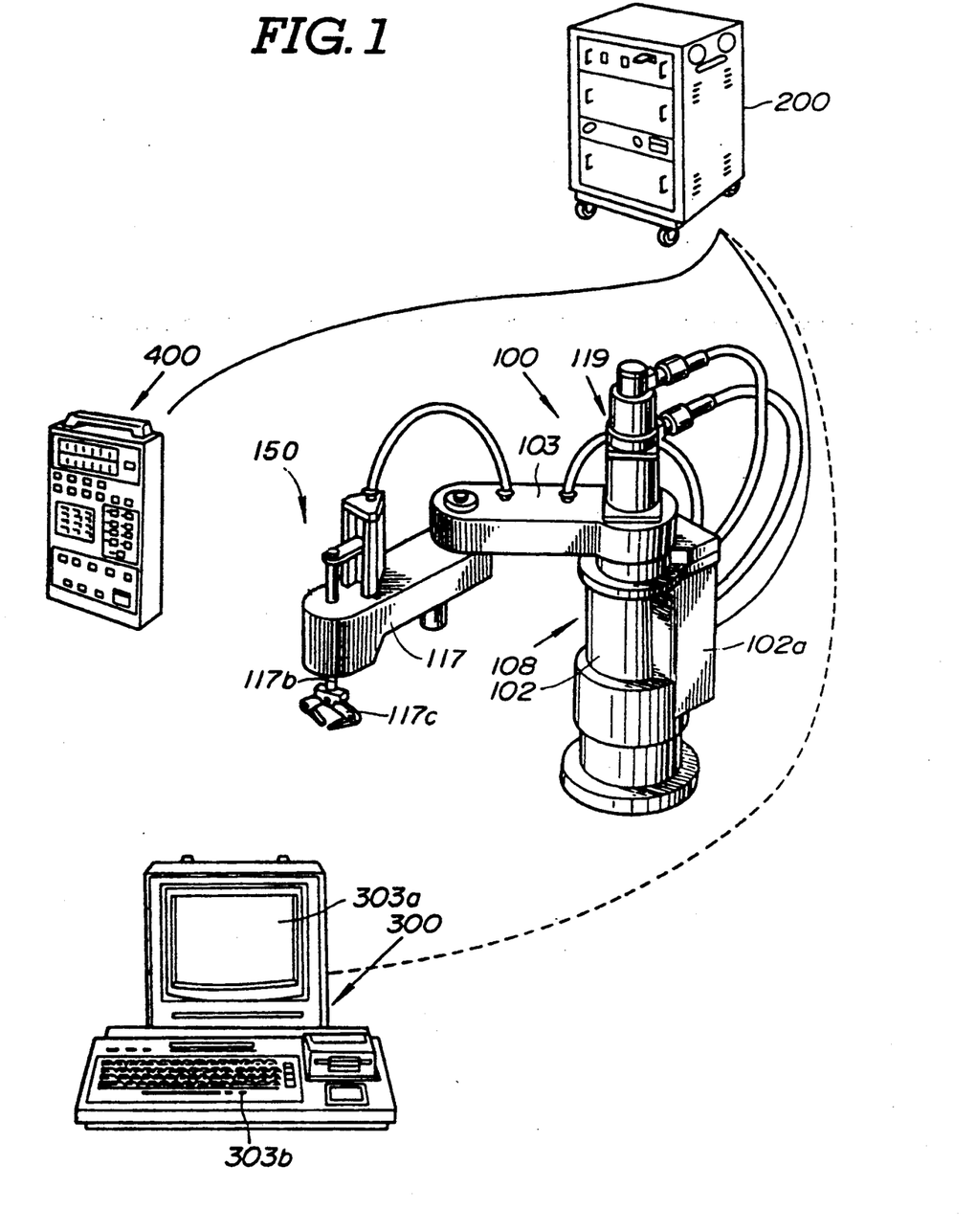
FIG. 1 is a fragmentary perspective illustration of the overall system of the preferred embodiment of an industrial robot according to the invention.
Figure 2:
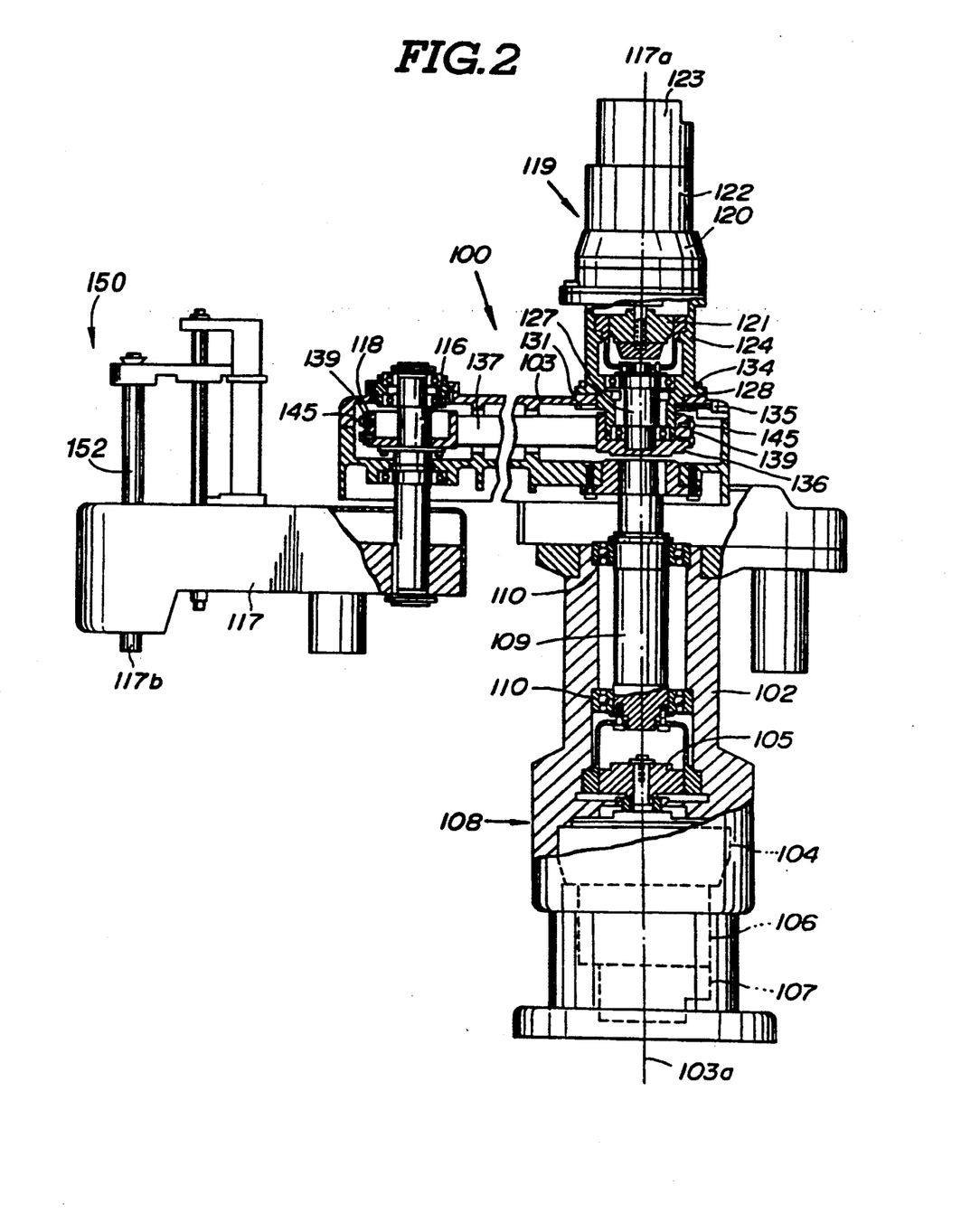
FIG. 2 is an enlarged side elevation in partial section of the preferred embodiment of the robot of the present invention.

Referring now to the drawings, particularly FIGS. 1 and 2, an industrial robot 100 is accompanied by a controller 200, a keyboard unit 300 including a keyboard array 303b and a monitor screen 303a, and a teaching box 400.

The robot 100 has a first pivotal arm 103 and a second pivotal arm 117. The first pivotal arm 103 is supported by and horizontally extends from a base 102. The first pivotal arm 103 pivots about a first vertical 103a. The second pivotal arm 117 is pivotally supported by and horizontally extends from the free end of the first arm 103. The second pivotal arm 117 is horizontally pivotable about a second pivot axis 117a and carries a wrist 117b. The wrist 117b is capable of grasping tools, such as a chuck 117c, for performing predetermined operations.

The robot 100 has a first servo system 108 for driving the first pivotal arm 103 and a second servo system 119 for driving the second pivotal arm, which together drive the wrist 117b and the chuck 117c forming a working end of the robot along a predetermined trace. The first and second servo systems are connected to the controller 200, which controls their operation. The controller 200 is, in turn, connected to the keyboard unit 300 and the teaching box 400. The keyboard unit 300 accepts programming for robot operation through its keyboard array 303b. Programming of the robot operation includes input of position data including position data specifying an initial working end position and position data specifying one or more working positions. The mode of operation of the teaching box 400 is well known and allows fine positioning of the working end at the working position or positions.

As shown in FIGS. 2 to 5, the first pivotal arm 103 is pivotally mounted at the top of the base 102. The first arm 103 is connected mechanically to the first servo system 108 which comprises a servo motor 104 and a reduction gear device 105, which, in this preferred embodiment, may be a reduction gear device available as "Harmonic Drive" from Harmonic Drive Systems, Inc. The first servo system 108 also includes an encoder 106 and a tacho-generator 107. The servo motor 104 is connected to a first drive shaft 109 via the reduction gear device 105. The servo motor 104, the reduction gear device 105, the encoder 106 and the tacho-generator 107 of the first servo system 108 are mounted on and supported by the base 102. The first drive shaft 109 is rotatably supported by the base 102 by means of upper and lower bearings 110. The upper end of the first drive shaft 109 is fixed to the first pivotal arm 103 so that the first pivotal arm pivots with the first drive shaft 109.

Figure 4:
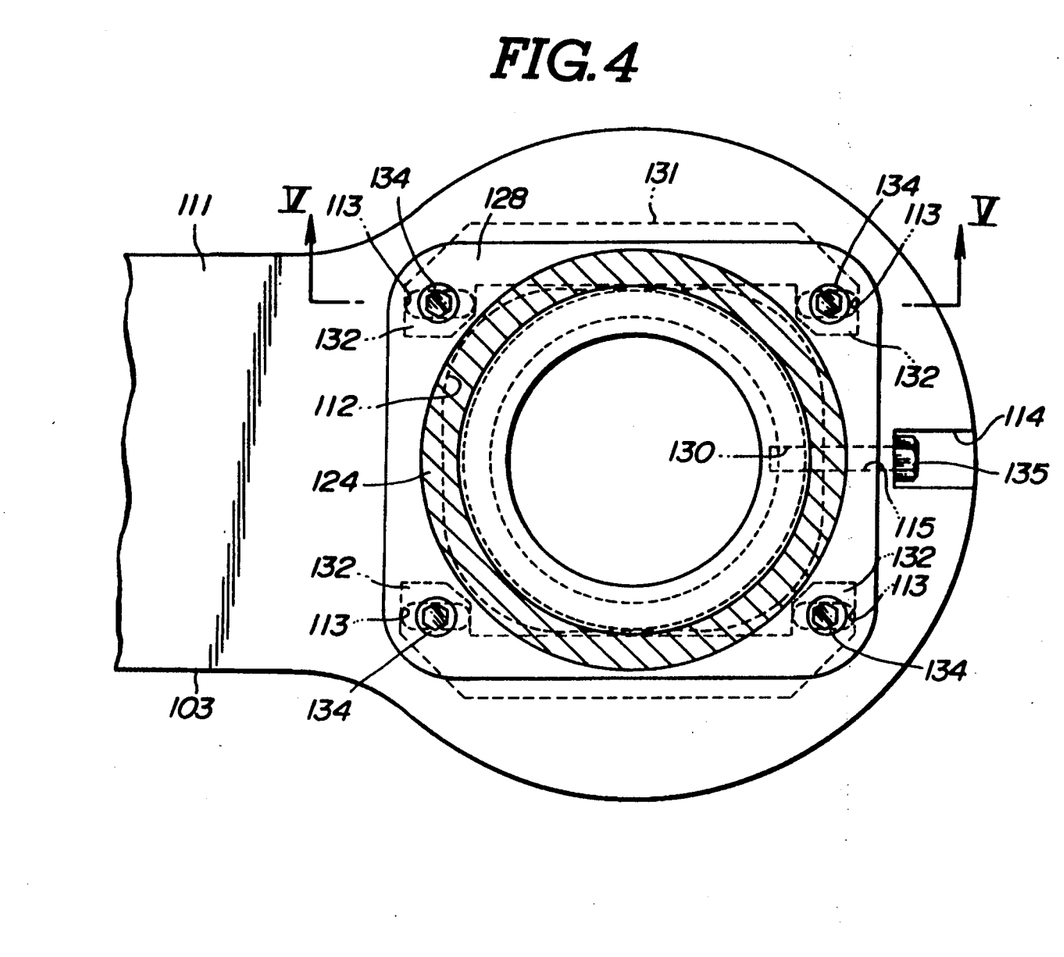
FIG. 4 is a section taken along line IV—IV of FIG. 3.
Figure 5:
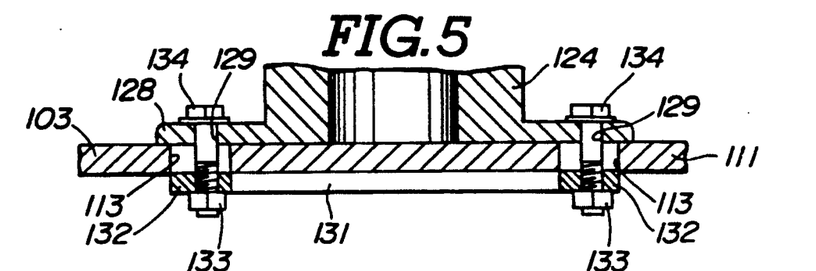
FIG. 5 is a section taken along line V—V of FIG. 4.

The first pivotal arm 103 has an upper plate 111. The upper plate 111 of the first pivotal arm 103 has a slightly-elongated rectangular hole 112 with rounded corners. The hole 112 is centered over the drive shaft 109. Slots 113 elongated parallel to the longitudinal axis of the first pivotal arm 103 are also formed through the upper plate 111 near the corners of the hole 112.

The first pivotal arm 103 has an axially aligned recess 114 in its upper edge, as shown in FIG. 4. A threaded hole 115 extends axially from the recess 114 toward the drive shaft 109.

The first pivotal arm 103 rotatably supports a vertically extending rotary shaft 116 at its free end. The rotary shaft 116 extends downwards from the first pivotal arm and is firmly fixed to one end of the second pivotal arm 117 at its lower end. A driven pulley 118 is received within the first pivotal arm and is fixed to the upper end of the rotary shaft 116. The driven pulley 118 is driven by the second servo system 119.

The second servo system 119 comprises a second servo motor 120, a reduction gear device 121 (Harmonic Drive), an encoder 122 and a tacho-generator 123. The reduction gear device 121 of the second servo system 119 is housed within a housing 124 with a chamber 125 which opens upwards. The housing 124 has a lower support section 126. The reduction gear device 121 is connected to a drive shaft 127 which is rotatably supported by the support section 126 of the housing 124. The lower end of the drive shaft 127 extends downwards from the support section 126. The second servo motor 120 is mounted atop the housing 124 and so closes the upper open end of the housing. The encoder 122 and the tachogenerator 123 are mounted on top of the housing together with the second servo motor 120.

Figure 3:
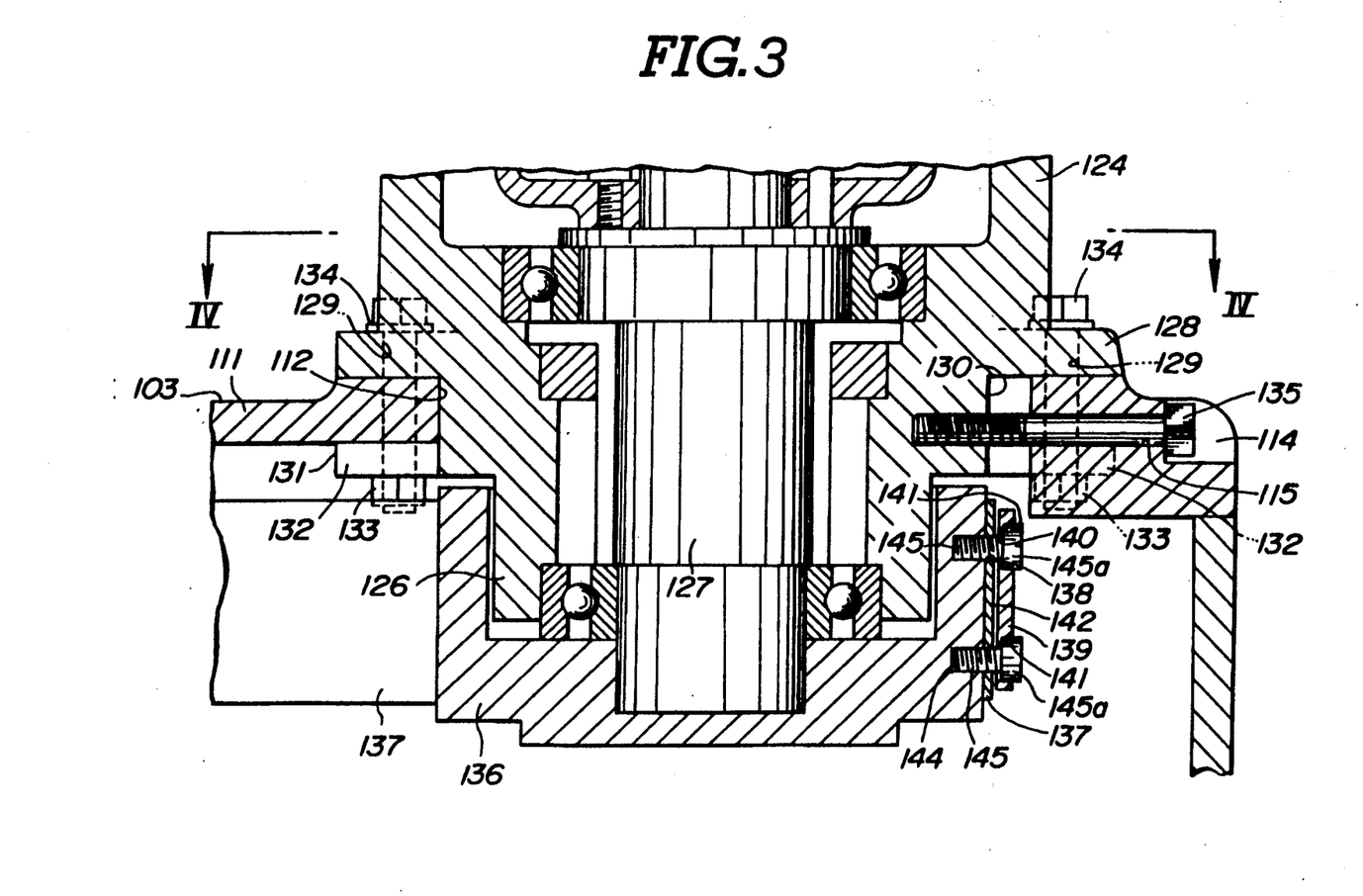
FIG. 3 is a further enlarged section showing how a servo motor for a movable robot arm is mounted.

An essentially square or rectangular flange 128 extends horizontally from the outer periphery of the housing 124. Through openings 129 pass through each corner of the flange 128. The housing 124 also has a threaded blind opening 130, as shown in FIG. 3. The support section 126 of the housing 124 conforms to the hole 112 in the upper plate 111 of the first pivotal arm 103. When the housing 124 is mounted on the upper plate 111 of the first pivotal arm 103 with the support section 126 extending through the hole 112, the flange 128 contacts the edges of the hole 112. In this position, the through openings 129 in the flange 128 can be aligned with the slots 113. Also, the threaded opening 130 can be aligned with the opening 115. A fastening plate or plates 131 are attached to the lower surface of the upper plate 111. The fastening plate 131 has sections 132 to which fastening nuts 133 are secured. The fastening plate 131 is attached to the upper plate 111 so that the fastening nuts 133 align with the slots 113 on the opposite side of the flange 128. Fastening bolts 134 pass through the openings 129 and the slots 113 to engage the fastening nuts 133. Thus, the housing 124 supporting the second servo system 119 is firmly mounted on the upper plate 111 of the first pivotal arm 103.

With this arrangement, since the slots 113 in the first pivotal arm 103 lie substantially parallel to the longitudinal axis of the first pivotal arm 103, the first pivotal arm 103 and the housing 124 can be displaced somewhat along the longitudinal axis of the arm 103. This allows adjustment of the position of the second servo system 119 relative the first pivotal arm 103.

An adjusting bolt 135 extends through the recess 114 and the hole 115 and engages the threaded hole 130 in the housing 24.

Figure 6:
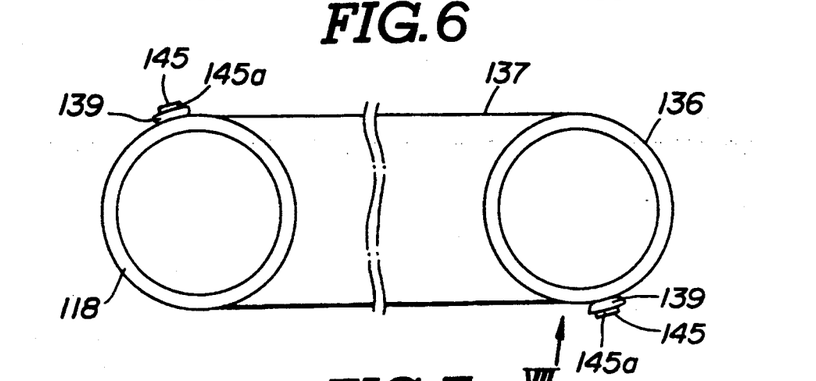
FIG. 6 is a fragmentary illustration of a drive connection between the output shaft of the servo motor and a rotary shaft of the movable arm by means of a driving belt.
Figure 7:
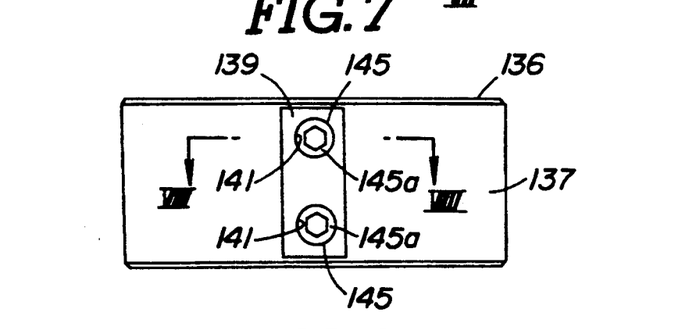
FIG. 7 is a side elevation of the drive belt as viewed along the arrow VII of FIG. 6.

A driving pulley 136 is fixed to the lower end of the output shaft 127 which is driven by the second servo motor 120 via the reduction gear device 121. A steel belt 137 is stretched between the driving pulley 136 and the driven pulley 118. The steel belt 137 is an endless loop of SK hardened steel. The steel belt 137 is formed with vertically aligned pairs of through holes 138. Two pairs of holes 138 are spaced precisely halfway around the loop 137, as shown in FIG. 6. A fastener plate 137 is attached to each of the pulleys 118, 136 via the pairs of holes 138. The fastener plates 139 are slightly narrower than the dimension between the flanges of the driving and driven pulleys 136 and 118. A pair of recesses 141 are formed in the outer periphery of the fastener plates 139 opposite the holes 138. A pair of holes 140 pass through each fastener plate 139 from the bottoms of the recesses 141. The through holes 140 are respectively aligned with the through holes 138. The inner face of the fastener plate 139 opposing the steel belt 137 has a radius of curvature smaller than the outer radius of the pulleys 136 and 118. Therefore, the inner face of the fastener plate 139 contacts the steel belt 137 along lines at its opposite edges to hold the steel belt 137 in place on the pulleys as explained below. The holes 138 and 140 are also aligned with threaded holes 144 in the driving and driven pulleys 136 and 118.

Figure 8:
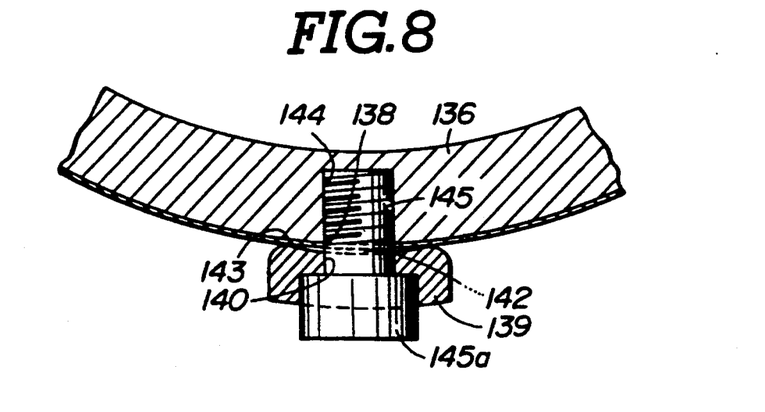
FIG. 8 is an enlarged section taken along line VIII—VIII of FIG. 7.

Fastening bolts 145 extend through the holes 138 and 140 and engage the corresponding threaded holes 144. By tightening the fastening bolts 145 firmly into the corresponding threaded holes 144, the fastener plates 139 are pulled tightly against the corresponding driving and driven pulleys 136 and 118. Thus, the fastener plates 139 clamp the steel belt 137 in place on the pulleys 136, 118 without applying force to the relatively weak section near the holes 138. As is apparent from FIG. 8, the heads 145a of the fastener bolt 145 protrude approximately half way out of the fastener plates 139.

The tension on the steel belt 137 is adjusted by means of the aforementioned adjusting bolt 135. First, the fastening bolts 134 which fix the housing 124 to the upper plate 111 of the first pivotal arm 103 are loosened so that the housing 124 can be moved along the longitudinal axis of the first pivotal arm 103. At this time, the fastening bolts 134 move along the slots 113. Then, the adjusting bolt 135 is turned in the loosening or tightening direction until the desired tension on the steel belt is obtained. After adjustment of the belt tension is completed, the fastening bolts 134 are again tightened to fix the housing 124 to the first pivotal arm 103.

Figure 10:
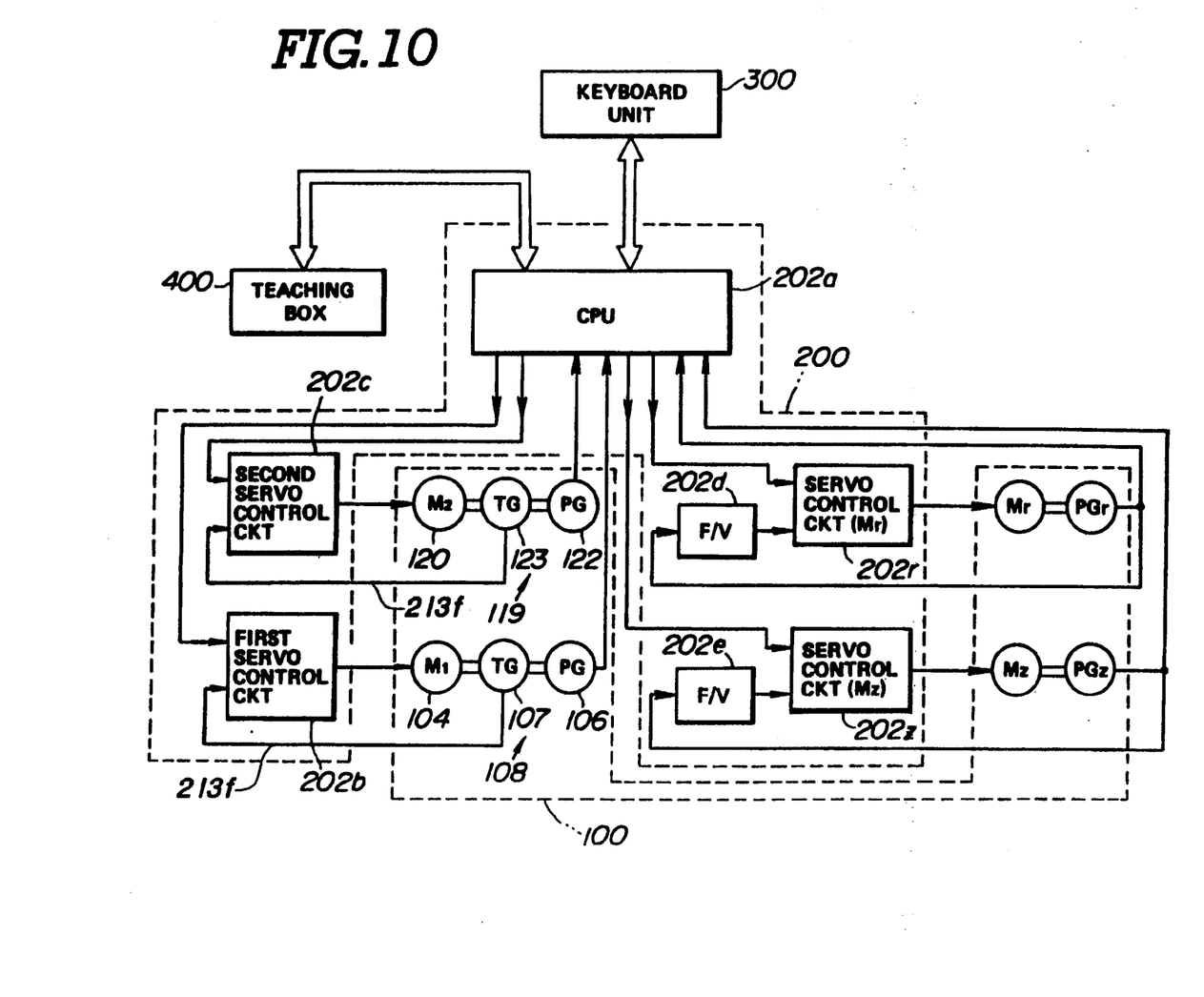
FIG. 10 is a schematic block diagram of the preferred embodiment of a controller for controlling robot operation, according to the invention.

A third servo system 150 is indicated in FIGS. 1 and 2 to be mounted near the free end of the second pivotal arm 117. The third servo system 150 controls vertical positioning of the chuck 117c at the working end 151 of the robot. The parts of the third servo system 150 that are not illustrated in FIGS. 1 and 2 are indicated in FIG. 10, or would be obvious in the art. Alternatively, the third servo system 150 may control rotation of the chuck 117c at the working end, whereby the desired robot operation is actually executed. In the arrangement of FIG. 1, the third servo system 150 drives the vertically movable shaft 152 vertically to position the chuck 117c serving as the working end. The third servo system 150 also controls the gripping and releasing motions of the chuck 117c which causes a component to be set up for assembly to the workpiece at the working position.

Figure 9:
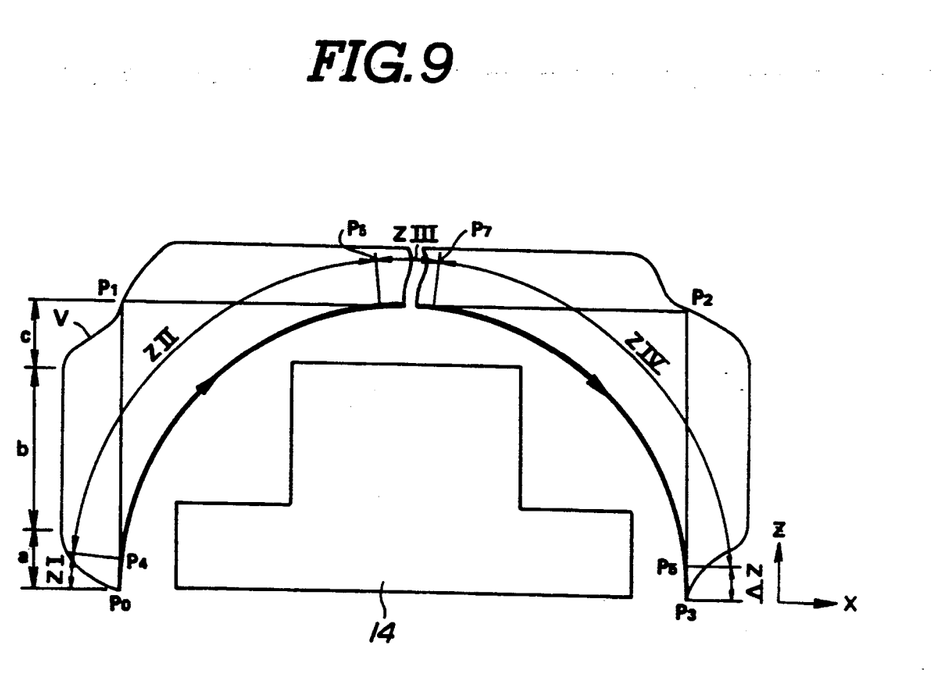
FIG. 9 is a diagram in elevation of the trace of the working end of the robot as operated according to the preferred embodiment of the control process of the invention.

In the preferred embodiment, the controller 200 is programmed to control the first, second and third servo systems so as to move the working end from its initial position $P_0$ to the working position $P_3$ along the trace illustrated in thick, solid lines in FIG. 9.

In conventional robot operation, in order to move the working end of the robot from the initial position $P_0$ to the working position $P_3$ around an obstacle 14, the working end is first moved to the intermediate point $P_1$ along a straight path $P_0$-$P_1$. Then, the working end stops at the point $P_1$ and thereafter is moved to a second intermediate point $P_2$ along a straight path $P_1$-$P_2$. The working end is again stopped at the second intermediate point $P_2$ and thereafter moved to the working position $P_3$ along a straight path $P_2$-$P_3$. In the first zone $P_0$-$P_1$, the working end is first accelerated to a predetermined top speed within an acceleration zone a. After accelerating to the top speed, the velocity of the working end is held constant at the top speed throughout a constant speed zone b and then decelerated to rest at the intermediate point $P_1$ within a deceleration zone c. Similarly, in the second zone $P_1$-$P_2$ and the third zone $P_2$-$P_3$, acceleration zones, constant speed zones and deceleration zones are defined. This clearly lowers the average velocity of the working end of the robot.

According to the preferred embodiment, the working end is controlled by the controller such that it moves along a single non-linear trace with no intermediate points at which the working end must come to rest.

FIG. 10 is a circuit diagram of the robot control system which carries out non-stop, non-linear robot positioning as set out above, according to the preferred embodiment of the invention. In FIG. 10, the controller 200 comprises a CPU 202a connected to the keyboard unit 300 and the teaching box 400. The CPU 202a is also connected to servo control circuits 202b, 202c, 202r and 202z. The servo control circuit 202b is connected to the first servo motor 104 ($M_1$) which is, in turn, connected to the tachogenerator 107(TG) and the encoder 106 (PG). The tachogenerator 107 outputs a motor speed indicative signal 213f to the servo control circuit 202b as a feedback signal. On the other hand, the encoder 106 detects the angular position of the motor shaft and thus of the first pivotal arm 103. The encoder 106 outputs an angular position indicative signal as a feedback signal to CPU 202a. Similarly, the servo control circuit 202c is connected to the second servo motor 120 ($M_2$) which is, in turn, connected to the tachogenerator 123 (TG) and the encoder 122 (TG). The tachogenerator 123 outputs a motor speed indicative signal 213f to the servo control circuit 202c as a feedback signal. The encoder 122 detects the angular position of the motor shaft and thus of the second pivotal arm 117. The encoder 106 outputs an angular position indicative signal as feedback signal to CPU 202a.

The servo control circuit 202r is connected to a servo motor $M_r$ which serves to control rotation of the working end. The servo motor $M_r$ is connected to an encoder $PG_r$ which detects the angular position of the servo motor $M_r$ and thus of the working end, and outputs an angular position indicative signal to CPU 202a as a feedback signal. Also, the angular position indicative signal of the encoder $PG_r$ is sent to the servo control circuit 202r as a feedback signal, via a frequency-to-voltage (F/V) converter 202d.

The servo motors $M_r$ and the encoder $PG_r$ may be housed in a connector box 102a fixed to the base 102.

The servo control circuit 202z is connected to a servo motor $M_z$ which serves to control vertical displacement of the working end. The servo motor $M_z$ is connected to an encoder $PG_z$ which detects the angular position of the servo motor $M_z$ and thus of the working end, and outputs an angular position indicative signal to CPU 202a as a feedback signal. Also, the angular position indicative signal of the encoder is sent to the servo control circuit 202z as a feedback signal, via a frequency-to-voltage (F/V) converter 202e.

The servo motor $M_z$ and the encoder $PG_z$ may be mounted near the free end of the second pivotal arm 117 as set forth above.

The controller 200 further comprises a memory 204 which stores the initial position data of the working end of the robot, the working position data, and other operational input provided through the keyboard unit 300 and/or the teaching box 400.

The CPU produces a first arm control signal having an angular position speed control component, a second arm control signal having an angular speed control component, a working end rotation control signal and a working end vertical control signal.

The first arm control signal is sent to the servo control circuit 202b to control the driving direction and driving speed of the first servo motor 104. Similarly, the second arm control signal is sent to the servo control circuit 202c to control the driving direction and driving speed of the second servo motor 120.

The F/V converters 202d and 202e serve as means for producing motor speed representative signals as feedback signals for the servo control circuits 202r and 202z respectively. The servo control circuit 202r receives the working end rotation control signal and controls the angular speed and in this sense the position of the working end of the robot in accordance with the control signal from CPU 202a, described later. Similarly, the servo control circuit 202z receives the working end vertical control signal from CPU 202a and controls the vertical speed and in this sense the vertical position of the working end.

According to the preferred embodiment of the invention, the controller 200 is programmed to move the working end along the thick, solid curve of FIG. 9. The path of the working end includes no intermediate points at which the working end must come to rest. Therefore, the working end moves through a single acceleration zone starting from the initial position $P_0$, a single deceleration zone ending at the working position $P_3$ and a single but rather long constant speed zone in between the acceleration zone and the deceleration zone.

Figure 11:
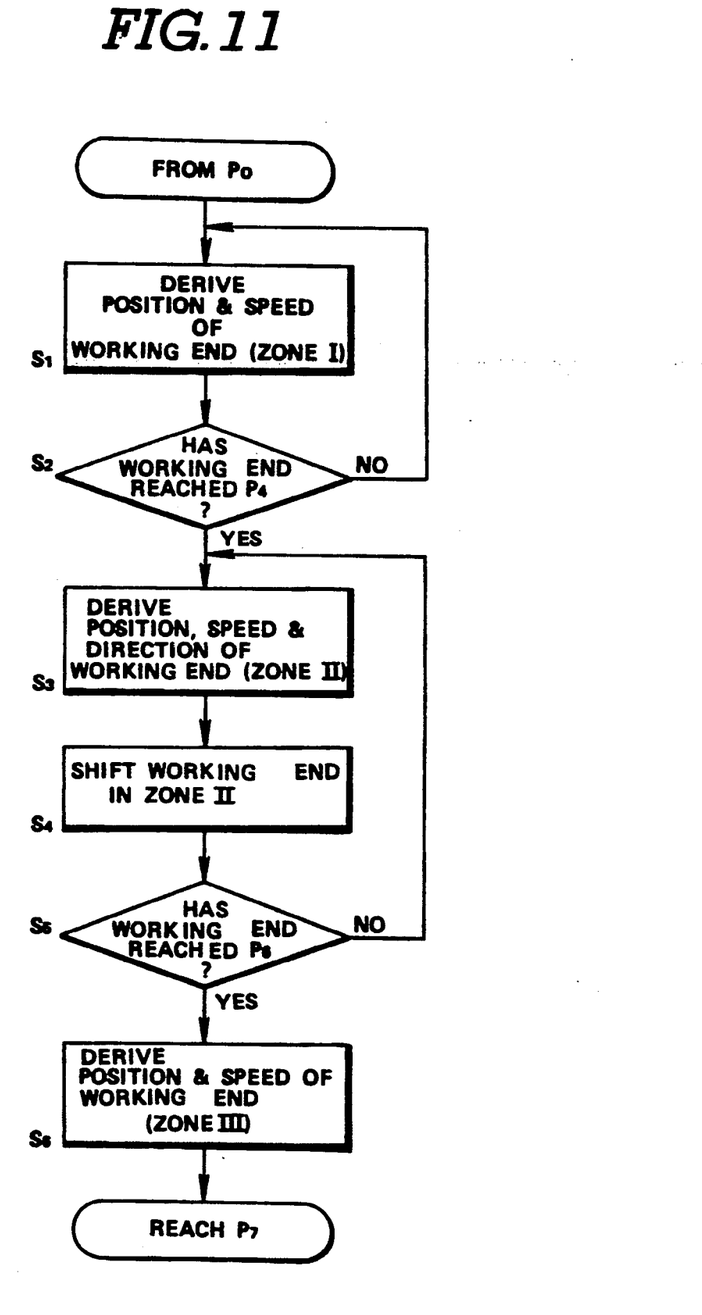
FIG. 11 is a flowchart of a robot control program executed by the controller of FIG. 10.

In order to facilitate a better understanding of the control process according to the present invention, the control operations of the preferred embodiment of robot according to the invention will be described herebelow with reference to FIGS. 9 and 11. In shifting the working end from its initial position $P_0$ to the working position $P_3$ around the obstacle 14, the working end follows both non-linear traces and straight stretches, as shown in FIG. 9.

Position data for the initial position $P_0$, the working position $P_3$ and intermediate points $P_1$ and $P_2$ in a unique three-dimensional robot coordinate system are received as operation parameters. An ideal or desired moving speed variation pattern for the working end determined on the basis of acceleration and deceleration characteristics of the servo motors is preset in the memory 204. Also, an initial lift distance through which the chuck 117c at the working end must be raised is set in the memory 204 through the keyboard unit 300 and/or the teaching box 400. The final drop distance through which the chuck 117c at the working end is lowered to the working position is also set in the memory 204. The lift and drop distance values may be given coordinates of the points $P_4$ and $P_5$ at which lift ends and drop begins, respectively. CPU 202a derives the distances between the initial position $P_0$ and the intermediate point $P_1$, between the intermediate point $P_2$ and the working position $P_3$ and between the intermediate points $P_1$ and $P_2$. On the basis of the distance data, the vertical moving speed variation pattern data, and the horizontal moving speed variation pattern data, CPU derives the trace, including an initial straight zone (ZI:$P_0$ to $P_4$, a first curved zone (ZII:$P_4$ to $P_6$) following the initial straight zone, an intermediate straight zone (ZIII:$P_6$ to $P_7$), a second curved zone (ZIV:$P_7$ to $P_5$) and final straight zone (ZV:$P_5$ to $P_3$). The length of each straight and curved zone ZI, ZII, ZIII, ZIV and ZV varies according to the unique speed variation patterns of the specific robot and the preset position data. CPU 202a derives the trace of the working end in the three-dimensional robot coordinate system, which trace is fully characterized by the straight and curved zones ZI, ZII, ZIII, ZIV and ZV, the speed and direction of the working end at specific points along the derived trace on the basis of the preset horizontal speed variation pattern and the preset vertical speed variation pattern.

It should be noted that the speed and the direction at each specific point in the curve zones is given as a vector with a speed component in a first direction, e.g. along the x-axis of the robot coordinate system and a speed component in a second direction, e.g. along the z-axis. Although FIG. 9 shows movement of the working end in a two-dimensional coordinate system defined by the x- and z-axes for simplification of the disclosure, the working end in practice moves through a three-dimensional robot coordinate system. In this case, the vector is a composite of a speed component in the first direction, e.g. along the x-axis of the robot coordinate system, a speed component in a second direction, e.g. along the z-axis and a speed component in the third direction, e.g. along the y-axis.

The acceleration and deceleration characteristics of servo motors employed in the preferred embodiment of the industrial robot have been illustrated by the thin, solid curves V in FIG. 9. As seen from the curve V, the servo motor accelerates and decelerates in such a manner that, in the acceleration zone a, the motor speed increases non-linearly and in fact can be expressed as a sine curve, and, in the deceleration zone, the motor speed also decreases non-linearly along a sine curve. By utilizing servo motors with acceleration and deceleration characteristics which cause non-linear motor speed variation, smooth transitions between the acceleration zone and the constant speed zone, and between the constant speed zone and the deceleration zone, can be achieved. In addition, the working end can be steadily lowered onto the working position by means of the characteristics V of FIG. 9.

Based on the data as set out above, CPU 202a performs position and speed control by deriving a first arm control signal, a second arm control signal, a working end rotation control signal and a working end vertical control signal, as discussed in greater detail above. CPU 202a also derives the coordinates for each boundary point between the straight zones and the curved zones and stores them in the memory 204. Then, the control program of FIG. 11 is periodically executed, e.g. every 10 msec. The flow chart of FIG. 11 shows control operations actuating the working end through the initial straight zone ZI, the first curved zone ZII and the intermediate straight zone ZIII.

As will be clear from the steps S1 and S2, as long as the working end remains in the initial straight zone ZI, CPU 202a outputs only the working end vertical control signal to the servo control circuit 202z to vertically actuate the working end. The servo motor $M_z$ is thus driven to accelerate the motor according to its own acceleration characteristics. During upward movement of the working end along the z-axis, the target position data and target motor speed value are cyclically derived, e.g. every 10 msec., in step S1, by the CPU 202a. The target position data and target motor speed value are compared to the actual position data provided by the encoder $PG_z$ and the actual motor speed value represented by the output of the F/V converter 202e. The comparison of the position data occurs in the CPU 202a and the comparison of the respective speeds of the four motors, or their components for the case of the two horizontal arms, are compared by the respective two servo control circuits. The servo motor $M_z$ is accordingly controlled in this sense on the basis of the deviation between the target position data and the actual position data, in addition to the target motor speed values and the actual motor speed values.

When the working end reaches the point $P_4$, the first and/or second arm control signals are output to activate the first and second servo motors 108 and 119. Therefore, the speed and direction of the working end is given hereafter as the vector sum of the instantaneous speed in the z-direction and the instantaneous speed in the x-direction. During movement of the working end within the first curved zone ZII, target position data and the vector data representative of the speed and direction are derived at a step S3. On the basis of the derived target position data and the vector data, the servo motors are controlled to drive the working end along the determined trace, at a step S4. At a step S5, the instantaneous working end position is checked to see whether the working end has reached the point $P_6$. Steps S3 through S5 are repeated until the working end reaches the point $P_6$. Similarly to the control of the movement of the working end within the initial straight zone ZI, feedforward control is performed for accuracy of the position and speed control.

When the working end reaches the point $P_6$, the target position and target motor speed for the first and second servo motors 103 and 117 are derived at a step S6, and this step is repeated until the working end reaches point $P_7$.

As will be appreciated, position and speed control within the intermediate straight zone III, the second curved zone ZVI and the final straight zone ZV is similar to that set out above.

As set forth above, according to the present invention, since the second servo motor 120 is mounted on the base 102, the load on the second pivotal arm 117 is significantly reduced. As a result, the inertia of the first and second pivotal arms is much smaller than in conventional robot systems in which the second servomotor is mounted at the free end of the first pivotal arm. This allows the second pivotal arm to be pivotted at higher speeds than in conventional robot systems. Therefore, the efficiency of the robot can be improved. Furthermore, since the robot is actuated between the initial position and the working position without stopping at an intermediate point or points, the total time required to move the working end from the initial position to the working position can be shortened significantly. This also serves to improve robot efficiency.

Therefore, the present invention fulfills all of the objects and advantages sought therefor.

Figure 12:
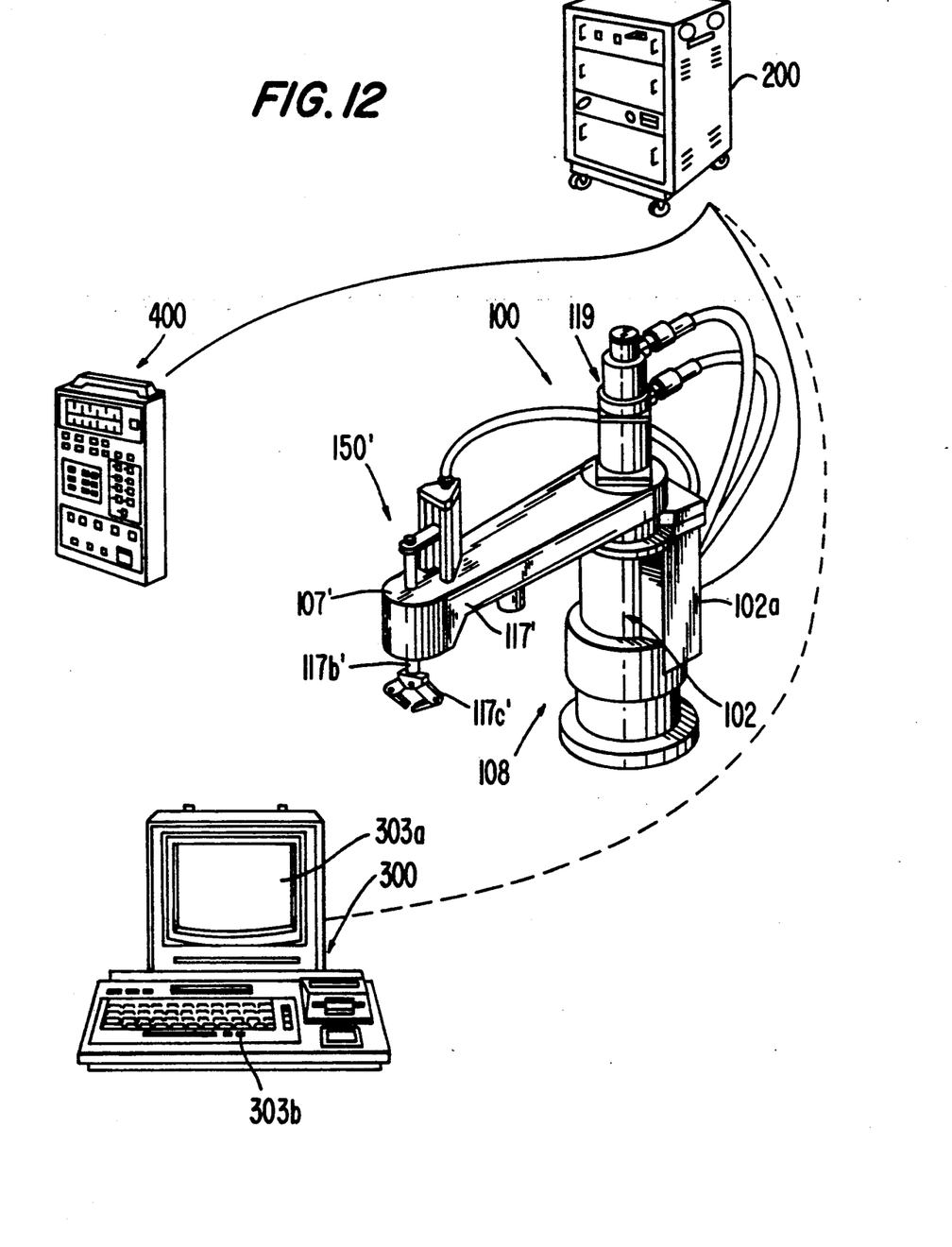
FIG. 12 is a fragmentary perspective illustration of an industrial robot according to the invention, similar to FIG. 1, wherein a movable arm is pivotable about a pivot axis, and movable along an axis.

FIG. 12 shows a fragmentary perspective illustration of another embodiment of the industrial robot according to the invention, similar to FIG. 1, wherein a movable arm 117' is supported by and extends horizontally from the base 102, rather than being connected to the arm 103. Otherwise, the operation of the arm 117' is like that previously described, and like reference numerals are primed to indicate like parts to FIG. 1.

While the present invention has been disclosed in detail in terms of the specific embodiment of the invention, the invention should be appreciated as being capable of embodiment in various ways. Also, the specific embodiment disclosed hereabove can be modified in many ways without departing from the principle of the invention. Therefore, the invention should be understood to include all possible embodiments and modifications to the preferred embodiment encompassed by the principles set out in the appended claims.

What is claimed is:

1. A robot device comprising:
 a base,
 a plurality of mechanical members connected successively to each other and to said base, including a first one of said members at a first end of said plurality of members connected to said base and second one of said members at the other end of said plurality of members from said first member, each successive adjacent pair of said members and base having a respective relative motion therebetween, and said second member having a near end connected to the respective adjacent one of said plurality of members and a far end opposite said near end,
 a plurality of mechanical power sources selectively mounted on said base and members, each said mechanical power source controlling said respective relative motion of a respective adjacent pair of said base and members,
 a plurality of indicator means distributed on said members and base for allowing determination of incremental changes in the relative positions of said adjacent pairs of base and members during each of a repeated predetermined interval, corresponding to the respective ones of said relative motions, and
 control means for controlling each of said source of mechanical power for moving said far end of said second member along a trace from an initial position to a working position without coming to a halt between said initial and working positions,
 wherein:
 said trace is nonlinear;
 said control means operates to determine said trace based on preset operational data, said preset operational data including the coordinates, in a respective coordinate system, of said initial and working positions, coordinates of further points for characterizing at least in part the part of said trace between said initial and working positions, and at least one speed variation pattern which takes into account acceleration and deceleration characteristics of said plurality of members with said mechanical power sources and indicator means; and said control means operates repeatedly at each said predetermined interval to determine 1) the location of said far end of said second member based on inputs from said indicator means indicating each of said incremental changes during the preceding interval, 2) information corresponding to the desired speed and direction of the motion of said far end of said second arm for the next interval, including components of velocity with respect to said coordinate system for the motion of said far end of said second arm along said trace, based on each said speed variation pattern, and 3) corresponding signals to be supplied simultaneously during the next interval to said mechanical power sources for driving respective ones of said mechanical power sources at respective rates of change of the corresponding ones of said relative positions to move said far end of said second member along said trace;

each said speed variation pattern comprising data specifying desired values of said respective ones of said velocity components in said coordinate system as a function of respective relative position values of said adjacent pairs of base and members, each said speed variation pattern having nonlinearly rising and falling parts, said far end of said second arm accordingly moving over said trace with smooth transitions of speed and direction;

said operational data includes a plurality of said speed variations patterns, and said determining of said velocity components of said far end of said second arm in said coordinate system in each said interval is according to each respective one of said speed variation patterns;

said trace is controlled by said control means to include an acceleration zone in the beginning part of said trace adjacent said initial position and a deceleration zone in the ending part of said trace adjacent said working position, said far end of said second member moves linearly in at least a portion of each of said acceleration and deceleration zones based on corresponding data included in said operational data, and each said linear part of each said acceleration or deceleration zone corresponds to a respective portion of one of said rising or falling parts of a respective one of said at least one speed variation pattern;

said first member having a near end connected to said base and a far end connected to said near end of said second member, said first member being connected at said near end thereof to said base to rotate in a horizontal plane about an axis extending through said base, said second member being connected at said near end thereof to said far end of said first member to move vertically with respect thereto, the respective one of said mechanical power means for controlling said relative motion between said base and said first member being a first servo motor mounted on said base, the respective one of said mechanical power means for controlling the rate of change of said relative motion between said first and second members being a second servo motor mounted on said first member, and said control means including servo control circuits for said first and second servo motors; and said trace includes two curved segments respectively adjacent said linear portions of said acceleration and deceleration zones and a linear segment between said two curved segments.

2. A robot device comprising:

a base, a plurality of mechanical members connected successively to each other to said base, including a first one of said members at a first end of said plurality of members connected to said base and a second one of said members at the other end of said plurality of members from said first member, each successive adjacent pair of said members and base having a respective relative motion therebetween, and said second member having a near end connected to the respective adjacent one of said plurality of members and a far end opposite said near end, a plurality of mechanical power sources selectively mounted on said base and members, each said mechanical power source controlling said respective relative motion of a respective adjacent pair of said base and members, a plurality of indicator means distributed on said members and base for allowing determination of incremental changes in the relative positions of said adjacent pairs of base and members during each of a repeated predetermined interval, corresponding to the respective ones of said relative motions, and control means for controlling each said source of mechanical power for moving said far end of said second member along a trace from an initial position to a working position without coming to a halt between said initial and working positions, wherein:

said trace is nonlinear:

said control means operates to determine said trace based on preset operational data, said preset operational data including the coordinates, in a respective coordinate system, of said initial and working positions, coordinates of further points for characterizing at least in part the path of said trace between said initial and working positions, at least one speed variation pattern which takes into account acceleration and deceleration characteristics of said plurality of members with said mechanical power sources and indicator means; and said control means operates repeatedly at each said predetermined interval to determine 1) the location of said far end of said second member based on inputs from said indicator means indicating each of said incremental changes during the preceding interval, 2) information corresponding to the desired speed and direction of the motion of said far end of said second arm for the next interval, including components of velocity with respect to said coordinate system for the motion of said far end of said second arm along said trace, based on each said speed variation pattern, and 3) corresponding signals to be supplied simultaneously during the next interval to said mechanical power sources for driving respective ones of said mechanical power sources at respective rates of change of the corresponding ones of said relative positions to move said far end of said second member along said trace; and each said speed variation pattern comprising data specifying desired values of said respective ones of said velocity components in said coordinate system as a function of respective relative position values of said adjacent pairs of base and members, each said speed variation pattern having nonlinearly rising and falling parts, said far end of said second arm accordingly moving over said trace with smooth transitions of speed and direction;

said far end of said second member is moved at constant speed along said trace, except while it is in an acceleration zone of said trace which starts at said initial position and a deceleration zone which ends at said working position, said far end of said second member moves linearly in at least a portion of each of said acceleration and deceleration zones based on corresponding data included in said operational data, and each said linear part of each said acceleration or deceleration zone corresponds to a respective portion of one of said rising or falling parts of a respective one of said at least one speed variation pattern;

said plurality of said mechanical members further comprising a third one of said members, said first member having a near end connected to said base and a far end opposite said near end thereof, said third member having a near end connected to said far end of said first member and a far end connected to said near end of said second member, said first member being connected at said near end thereof to said base to rotate in a horizontal plane about a vertical axis extending through said base, said third member being connected to said first member to rotate in a horizontal plane about a second vertical axis, said second member being oriented vertically and connected at said near end thereof to said far end of said third member so that said far end of said second member can be moved vertically with respect to said far end of said third member, the respective one of said mechanical power means for controlling the rate of change of said relative motion between said base and said first member being a first servo motor mounted on said base, the respective one of said mechanical power means for controlling the rate of change of said relative motion between said first and third members being a second servo motor mounted on said first member, the respective one of said mechanical power means for controlling the rate of change of said relative motion between said third and second members being a third servo motor mounted on said third member, said control means including servo control circuits for said first, second and third servo motors; and said trace includes two curved segments respectively adjacent said linear portions of said acceleration and deceleration zones and a linear segment between said two curved segments.

3. A robot device comprising:

a base, a plurality of mechanical members connected successively to each other and to said base, including a first one of said members at a first end of said plurality of members connected to said base and a second one of said members at the other end of said plurality of members from said first member, each successive adjacent pair of said members and base having a respective relative motion therebetween, and said second member having a near end connected to the respective adjacent one of said plurality of members and a far end opposite said near end, a plurality of mechanical power sources selectively mounted on said base and members, each said mechanical power source controlling said respective relative motion of a respective adjacent pair of said base and members, a plurality of indicator means distributed on said members and base for allowing determination of incremental changes in the relative positions of said adjacent pairs of base and members during each of a repeated predetermined interval, corresponding to the respective ones of said relative motions, and control means for controlling each said source of mechanical power for moving said far end of said second member along a trace from an initial position to a working position without coming to a halt between said initial and working positions, wherein:

said trace is nonlinear;

said control means operates to determine said trace based on preset operational data, said preset operational data including the coordinates, in a respective coordinate system, of said initial and working positions, coordinates of further points for characterizing at least in part the path of said trace between said initial and working positions, and at least one speed variation pattern which takes into account acceleration and deceleration characteristics of said plurality of members with said mechanical power sources and indicator means; and said control means operates repeatedly at each said predetermined interval to determine 1) the location of said far end of said second member based on inputs from said indicator means indicating each one of said incremental changes during the preceding interval, 2) information corresponding to the desired speed and direction of the motion of said far end of said second arm for the next interval, including components of velocity with respect to said coordinate system for the motion of said far end of said second arm along said trace, based on each said speed variation pattern, and 3) corresponding signals to be supplied simultaneously during the next interval to said mechanical power sources for driving respective ones of said mechanical power sources at respective rates of change of the corresponding ones of said relative positions to move said far end of said second member along said trace; and each said speed variation pattern comprising data specifying desired values of said respective ones of said velocity components in said coordinate system as a function of respective relative position values of said adjacent pairs of base and members, each said speed variation pattern having non-linearly rising and falling parts, said far end of said second arm accordingly moving over said trace with smooth transitions of speed and direction;

said operational data includes a plurality of said speed variation patterns, and said determining of said velocity components of said far end of said second arm in said coordinate system in each said interval is according to each respective one of said speed variation patterns;

said trace is controlled by said control means to include an acceleration zone in the beginning part of said trace adjacent said initial position and a deceleration zone in the ending part of said trace adjacent said working position, said far end of said second member moves linearly in at least a portion of each of said acceleration and deceleration zones based on corresponding data includes in said operational data, and each said linear part of each said acceleration or deceleration zone corresponds to a respective portion of one of said rising or falling parts of a respective one of said at least one speed variation pattern;

said plurality of said mechanical members further comprising a third one of said members, said first member having a near end connected to said base and a far end opposite said near end thereof, said third member having a near end connected to said far end of said first member and a far end connected to said near end of said second member, said first member being connected at said near end thereof to said base to rotate in a horizontal plane about a vertical axis extending through said base, said third member being connected to said first member to rotate in a horizontal plane about a second vertical axis, said second member being oriented vertically and connected at said near end thereof to said far end of said third member so that said far end of said second member can be moved vertically with respect to said far end of said third member, the respective one of said mechanical power means for controlling the rate of change of said relative motion between said base and said first member being a first servo motor mounted on said base, the respective one of said mechanical power means for controlling the rate of change of said relative motion between said first and third members being a second servo motor mounted on said first member, the respective one of said mechanical power means for controlling the rate of change of said relative motion between said third and second members being a third servo motor mounted on said third member, said control means including servo control circuits for said first, second and third servo motors;

each said servo control circuit is provided from the respective one of said indicator means during each said interval with a respective feedback which corresponds to the rate of change of the corresponding relative position during the preceding interval;

each said speed variation pattern rises smoothly and non-linearly from zero to a respective maximum constant value and subsequently falls smoothly and non-linearly to zero;

said speed variation patterns include respective ones for x- and z-axes of said coordinate system;

said z-axis is vertical and said x-axis is horizontal, said linear portions of said trace corresponding to said acceleration and deceleration zones are oriented vertically; and said trace includes two curved segments respectively adjacent said linear portions of said acceleration and deceleration zones and a linear segment between said two curved segments.

* * * * *